United States Patent
Jones et al.

(10) Patent No.: US 9,757,980 B1
(45) Date of Patent: Sep. 12, 2017

(54) SWIVEL CASTER WITH SWIVEL LIMITER AND SLIDE MECHANISM

(71) Applicant: Hamilton Caster & Manufacturing Company, Hamilton, OH (US)

(72) Inventors: Lester Jones, Hamilton, OH (US); Patrick L. McCartney, Fairfield, OH (US); Yefim Spektor, Mason, OH (US); John Yater, Hamilton, OH (US)

(73) Assignee: Hamilton Caster & Manufacturing Company, Hamilton, OH (US)

( * ) Notice: Subject to any disclaimer, the term of this patent is extended or adjusted under 35 U.S.C. 154(b) by 44 days.

(21) Appl. No.: 15/099,030

(22) Filed: Apr. 14, 2016

(51) Int. Cl.
*B60B 33/00* (2006.01)
*B62B 3/00* (2006.01)

(52) U.S. Cl.
CPC ........ *B60B 33/006* (2013.01); *B60B 33/0068* (2013.01); *B62B 3/00* (2013.01)

(58) Field of Classification Search
CPC .... F16B 33/00; F16B 33/0055; F16B 33/006; F16B 33/0065; F16B 33/0068; F16B 33/02; B62B 3/00; B62B 2301/046; B62B 2301/0463
USPC .......... 16/20, 21, 24, 26, 35 D, 42 R, 45, 48
See application file for complete search history.

(56) References Cited

U.S. PATENT DOCUMENTS

| | | | |
|---|---|---|---|
| 1,839,396 A * | 1/1932 | Kimball | B60B 33/04 16/102 |
| 2,468,399 A * | 4/1949 | Albert | B60B 33/00 16/18 R |
| 2,719,724 A | 10/1955 | Lundgren | |
| 4,084,288 A * | 4/1978 | Black | B60B 33/0002 16/21 |
| 4,205,413 A * | 6/1980 | Collignon | B60B 33/021 16/35 D |
| 4,349,937 A * | 9/1982 | Fontana | B60B 33/0078 16/35 R |
| 4,349,938 A * | 9/1982 | Fontana | B60B 33/0078 16/35 R |
| 5,996,176 A | 12/1999 | Ghouse | |
| 6,725,501 B2 * | 4/2004 | Harris | B60B 33/0007 16/31 A |

(Continued)

FOREIGN PATENT DOCUMENTS

| JP | S5583602 A | 6/1980 |
|---|---|---|
| JP | S5755201 A | 4/1982 |
| JP | H03271002 A | 12/1991 |

*Primary Examiner* — Roberta Delisle
(74) *Attorney, Agent, or Firm* — Wood, Herron & Evans, LLP

(57) ABSTRACT

A swivel caster includes a swivel assembly having a swivel plate configured to be mounted to a vehicle and defining a swivel axis. A horn depends downwardly from the swivel assembly and a wheel is wheel coupled to the horn with a wheel axle. A slide mechanism couples the horn to the swivel assembly and enables the wheel to slide in a direction generally perpendicular to the swivel axis between first and second trailing positions. The slide mechanism swivels with the horn, the wheel, and the swivel plate about the swivel axis. A swivel limiter is operatively associated with the swivel assembly and limits a swiveling range of the wheel about the swivel axis so as to activate the slide mechanism to reposition the wheel from the first trailing position to the second trailing position when a direction of travel of the vehicle changes.

20 Claims, 12 Drawing Sheets

(56) References Cited

U.S. PATENT DOCUMENTS

| | | | |
|---|---|---|---|
| 9,051,965 B1* | 6/2015 | Spektor | F16C 19/505 |
| 9,428,009 B2* | 8/2016 | Sharratt | B60B 33/0028 |
| 9,650,060 B2* | 5/2017 | Kopp | B62B 3/00 |
| 2011/0113593 A1 | 5/2011 | Bebbington | |
| 2015/0298504 A1 | 10/2015 | Dull et al. | |

* cited by examiner

SWIVEL CASTER WITH SWIVEL LIMITER AND SLIDE MECHANISM

TECHNICAL FIELD

The present invention relates generally to casters, and more particularly, to swivel casters.

BACKGROUND

Casters are commonly mounted to transport vehicles, such as carts, trailers, trucks, or dollies, and allow for rolling movement of the transport vehicle along a ground surface. Conventional casters generally include a horn (also referred to as a yoke) having a pair of legs that extend downwardly and support a caster wheel that rolls along the ground surface.

Casters may be designed to rotate, or "swivel," about a vertical axis (termed "swivel" casters), or they may be fixed (termed "rigid" casters). Conventional swivel casters generally include a horn that is rotatably coupled to a swivel plate, which in turn is mounted to a vehicle, such that the horn and caster wheel may swivel about a vertical swivel axis relative to the swivel plate and the vehicle. This swiveling action enables the caster wheel to change direction while rolling, thereby allowing an operator to turn or otherwise steer the vehicle. In contrast, rigid casters generally include a horn that is rigidly attached to the vehicle via a mounting plate, such that the caster wheel does not swivel. Transport vehicles may be fitted with one or more swivel casters and one or more rigid casters, depending on the application and vehicle design. In a common arrangement, a vehicle may include swivel casters on a rear operator-end of the vehicle, and rigid casters on a front end of the vehicle. For improved vehicle maneuverability in tight spaces, the vehicle may be provided with swivel casters at both vehicle ends, as often seen on grocery carts, for example.

On conventional swivel casters, the wheel is mounted with its axle such that the horizontal wheel axis is offset laterally from the vertical swivel axis. In other words, the wheel is mounted such that the vertical swivel axis does not pass through the horizontal wheel axis. During vehicle movement, this offset enables the wheel to change direction as needed in order to position itself behind (or "trail") the swivel axis, thereby maintaining proper self-alignment with the direction of travel of the vehicle.

When the vehicle reverses its direction of travel, the caster wheel must swivel a full 180 degrees through an arc to a new trailing position in order to realign itself with the new direction of travel of the vehicle. As the wheel swivels, it passes through a point in its arc at which the wheel is momentarily perpendicular to the new direction of travel. At this point, the wheel frictionally drags across, or "scrubs," the floor, thereby requiring an increase in force applied by the operator to the vehicle in order to complete the vehicle turn. This "scrubbing" undesirably increases stress on the swivel bearing components and the wheel tread, and accelerates their wear.

To address this shortcoming of conventional swivel casters, attempts have been made to produce a swivel caster in which the wheel is able to slide horizontally, relative to the swivel plate, between first and second trailing positions arranged on opposing sides of the swivel axis. The objective was to eliminate the need for the caster to swivel when reversing direction, and instead achieve a change in direction by relying solely on a horizontal repositioning (i.e., sliding) of the wheel relative to the swivel plate and vehicle. However, these prior attempts have failed to produce a design having a slide mechanism that operates effectively when under compressive radial load (i.e., along the swivel axis), or that is properly activated so as to truly minimize the degree of swiveling, and thus scrubbing, of the wheel during a change in direction of the vehicle. For example, the wheel of known swivel casters having a slide mechanism would prefer to fully swivel, rather than slide, to a new trailing position if there is even a slight misalignment between the sliding axis of the slide mechanism and the new direction of travel of the vehicle (e.g., a direction of force exerted on the vehicle by an operator).

Accordingly, there remains a need for improvements to known swivel casters to address the shortcomings described above.

SUMMARY

A swivel caster according to an exemplary embodiment of the invention includes a swivel assembly, a horn, a wheel, a slide mechanism, and a swivel limiter. The swivel assembly includes a swivel plate configured to be mounted to a vehicle, and defines a swivel axis. The horn depends downwardly from the swivel assembly, and the wheel is coupled to the horn with a wheel axle and swivels with the horn about the swivel axis. The slide mechanism couples the horn to the swivel assembly and enables the wheel to slide in a direction generally perpendicular to the swivel axis between first and second trailing positions. The slide mechanism also swivels with the horn and the wheel about the swivel axis. The swivel limiter is operatively associated with the swivel assembly and limits a swiveling range of the wheel about the swivel axis so as to activate the slide mechanism to reposition the wheel from the first trailing position to the second trailing position when a direction of travel of the vehicle changes.

A transport vehicle according to an exemplary embodiment of the invention includes at least one swivel caster having a swivel assembly, a horn, a wheel, a slide mechanism, and a swivel limiter similar to those described above.

Various additional features and advantages of the invention will become more apparent to those of ordinary skill in the art upon review of the following detailed description of multiple illustrative embodiments taken in conjunction with the accompanying drawings. The drawings, which are incorporated in and constitute a part of this specification, illustrate multiple embodiments of the invention and, together with the general description given above and the detailed description given below, serve to explain the multiple embodiments of the invention.

DETAILED DESCRIPTION

Figure 1:
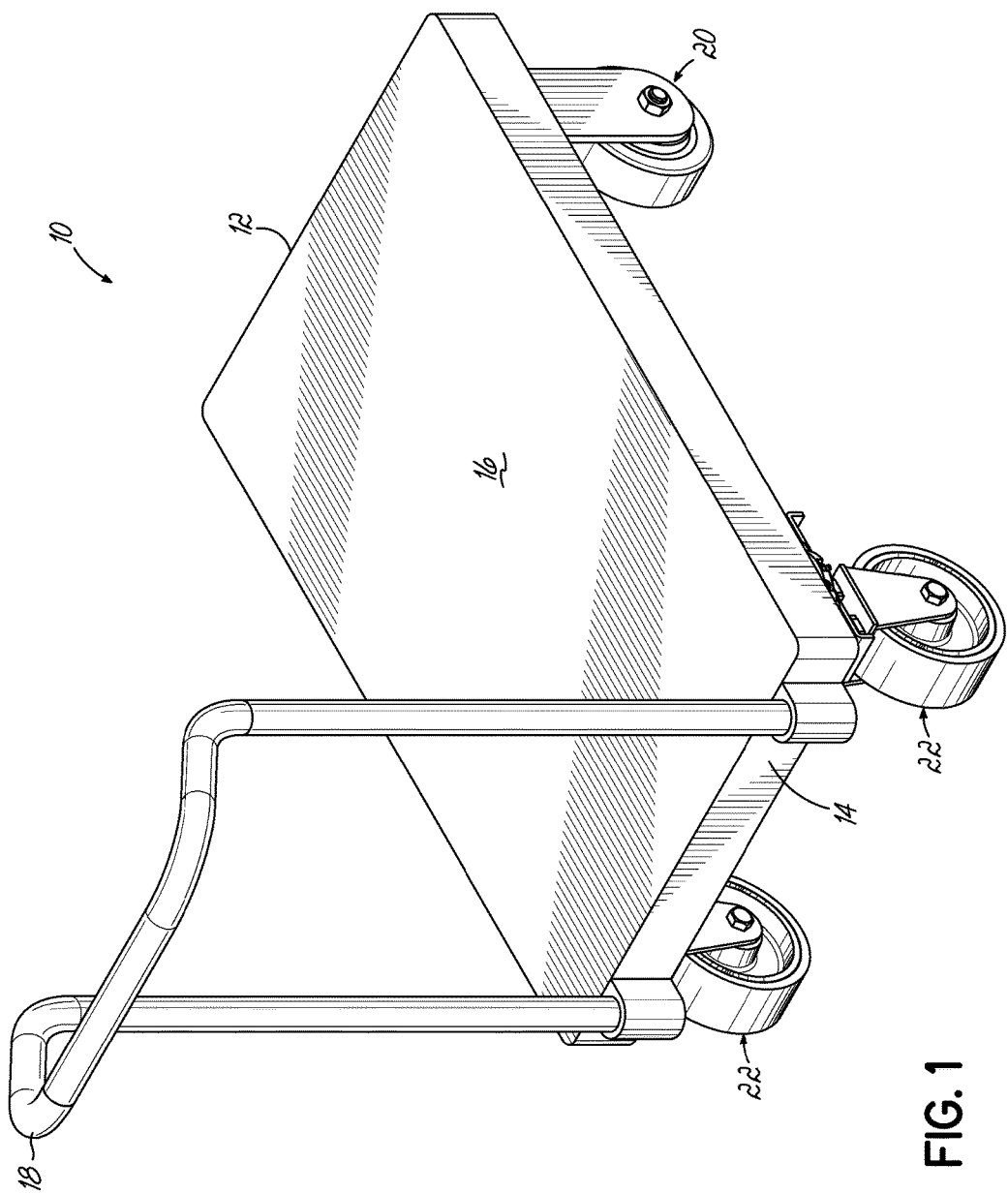
FIG. 1 is a perspective view of an exemplary transport vehicle having a pair of swivel casters and a pair of rigid casters.

Referring now to the Figures, and beginning with FIG. 1, an exemplary transport vehicle in the form of a platform truck 10 is shown. The platform truck 10 includes a front end 12, a rear end 14, a platform 16, and a handle bar 18. The platform truck 10 is provided at its front end 12 with a pair of rigid casters 20 (one caster 20 being hidden from view), and at its rear end 14 with a pair of swivel casters 22, which may be in the form of either of the exemplary swivel casters 30, 100 described below. The platform 16 is configured to receive a load of one or more objects for transportation by the truck 10 along a ground surface. The handle bar 18 may be formed of tubular piping, and is configured to be gripped by an operator for exerting push and pull forces for steering and otherwise moving the truck 10 in a desired direction. While the transport vehicle is shown in the form of platform truck 10 having a particular arrangement of casters 20, 22, it will be appreciated that the vehicle may take various alternative forms, such as a tilt truck for example, and include various alternative arrangements of casters 20, 22.

Figure 2:
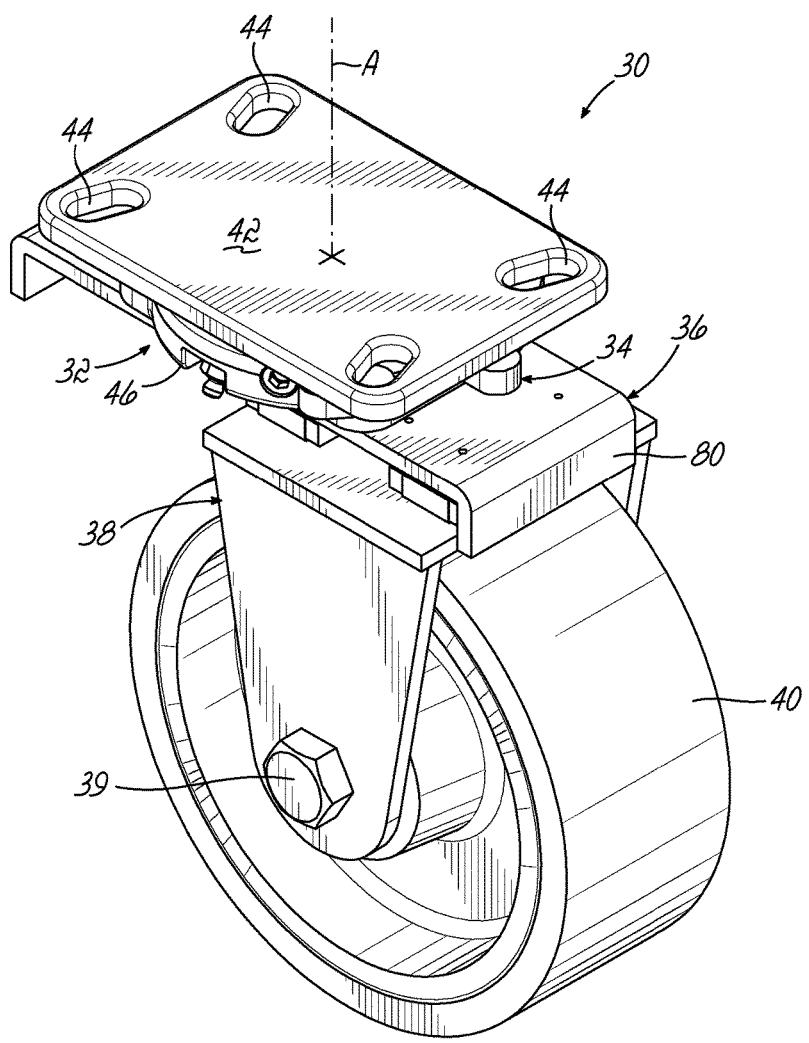
FIG. 2 is a top perspective view of a swivel caster having a slide mechanism and a swivel limiter in accordance with a first exemplary embodiment of the invention.
Figure 3:
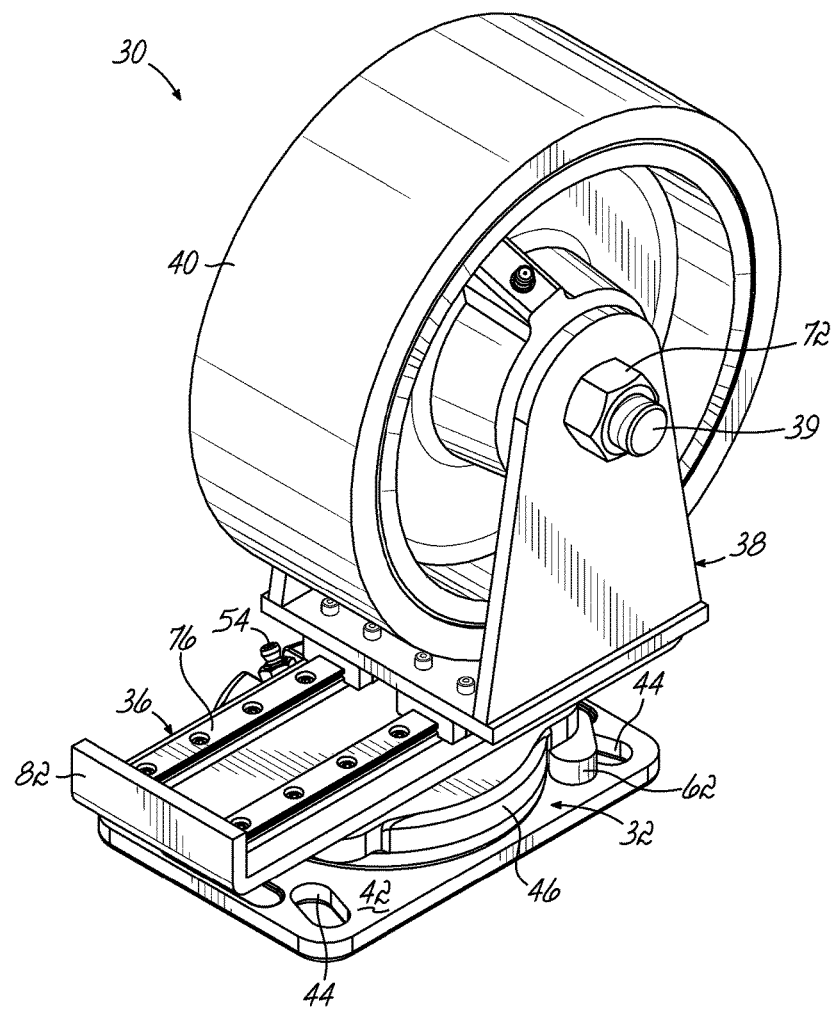
FIG. 3 is a bottom perspective view of the swivel caster of FIG. 1.
Figure 4:
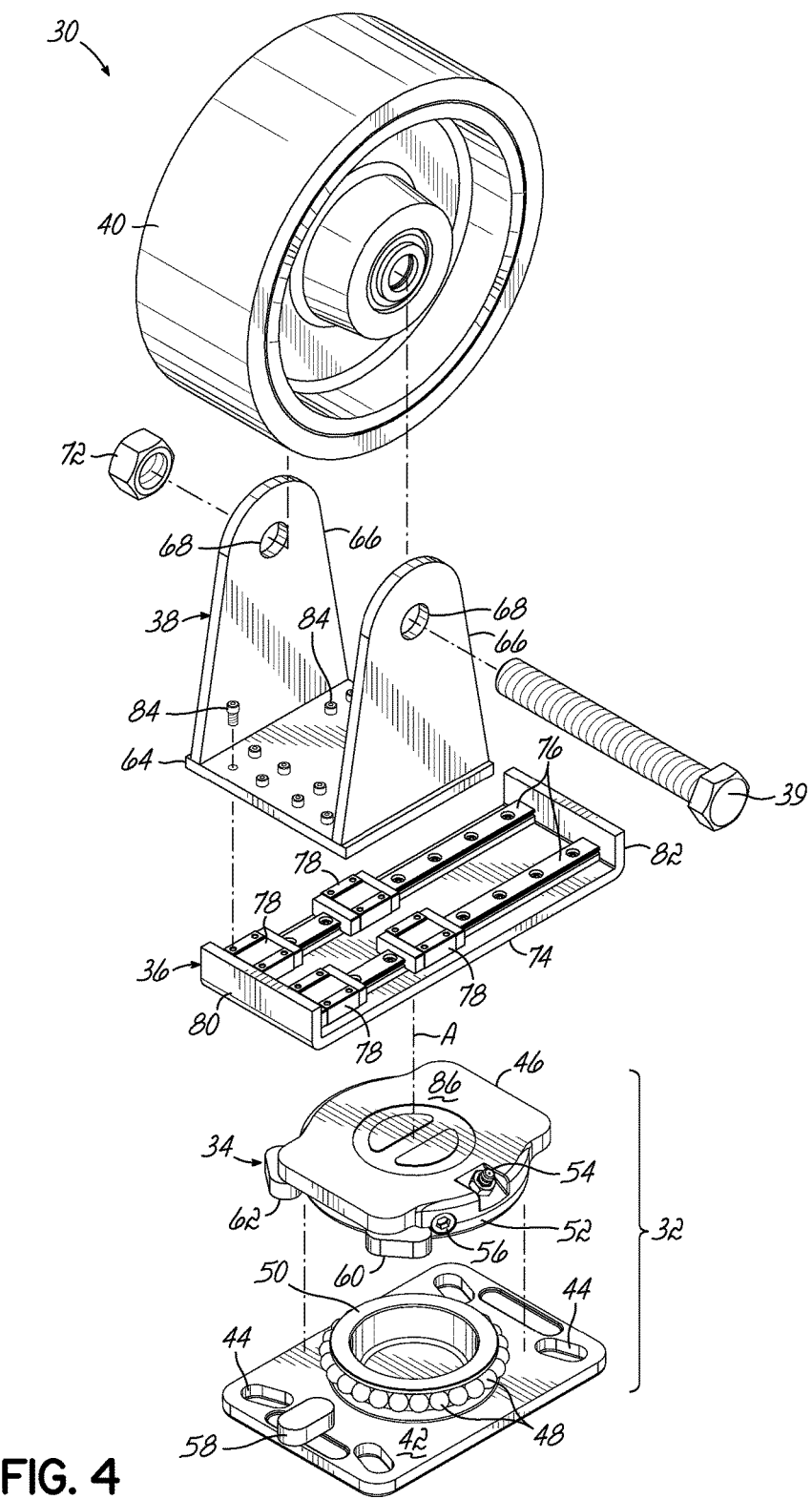
FIG. 4 is a partially exploded view of the swivel caster of FIG. 1.

Referring to FIGS. 2-4, a swivel caster 30 according to an exemplary embodiment of the invention is shown. The swivel caster 30 generally includes a swivel assembly 32 defining a swivel axis A, a swivel limiter 34, a slide mechanism 36, a horn 38, an axle 39, and a wheel 40 that swivels with the horn 38 and slide mechanism 36 about the swivel axis A. As described in greater detail below, the swivel limiter 34 limits a swiveling range of the wheel 40 about the swivel axis A so as to activate the slide mechanism 36 to reposition the wheel 40 with sliding movement between first and second trailing positions when the vehicle to which the caster 30 is mounted changes its direction of travel, and particularly when the vehicle generally reverses its direction of travel.

The swivel assembly 32, arranged at an upper end of the swivel caster 30, includes a swivel plate 42 configured to be mounted to a transport vehicle via mounting holes 44 and threaded fasteners (not shown). The swivel assembly 32 further includes a swivel ring 46 rotatably coupled to the swivel plate 42, and a plurality of rolling bearing elements, shown in the form of spherical bearing balls 48, that enable the swivel ring 46 to rotate, or "swivel," relative to the swivel plate 42 about the swivel axis A. The bearing balls 48, best shown in FIG. 4, are retained in an annular ring formation by an inner bearing race 50 coupled to or formed on the swivel plate 42, and an outer bearing race 52 coupled to or formed on the swivel ring 46 (see also FIG. 11). It will be appreciated that the swivel assembly 32 may be a "kingpinless" type swivel assembly. Further, while spherical bearing elements 48 are shown, it will be appreciated that various other types of known rolling bearing elements may be used in alternative embodiments.

As shown best in FIG. 4, the swivel ring 46 may further include a fitting 54 through which a lubricant, such as grease, may be directed for lubricating the bearing elements 48 retained between the bearing races 50, 52. The swivel ring 46 may also include a removable plug 56 that plugs a ball port (not shown) extending through the outer bearing race 52, through which the bearing elements 48 may be loaded during assembly of the swivel caster 30.

Figure 5A:
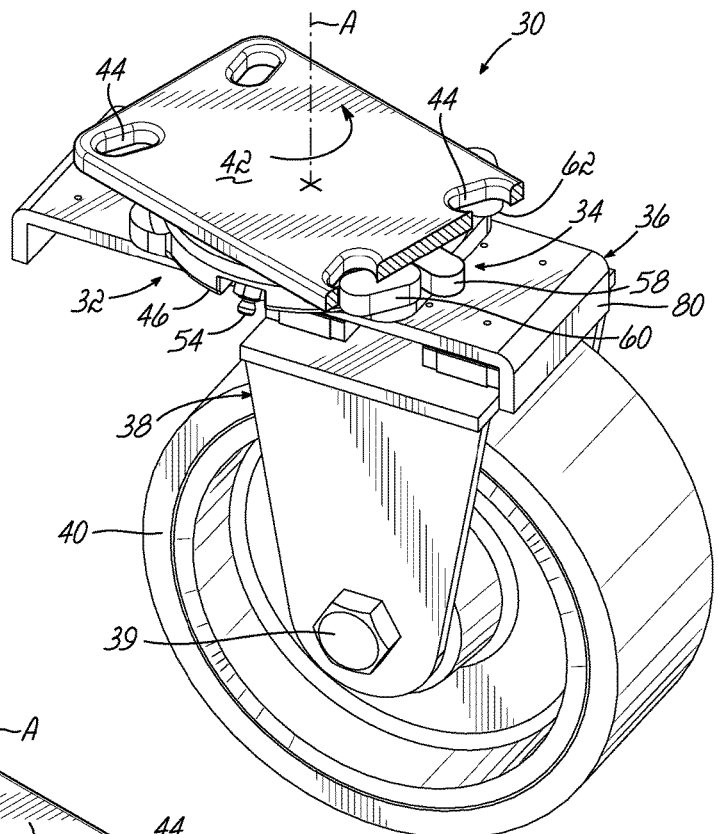
FIG. 5A is a perspective view of the swivel caster of FIG. 1, shown in an exemplary first swiveled position.
Figure 5B:
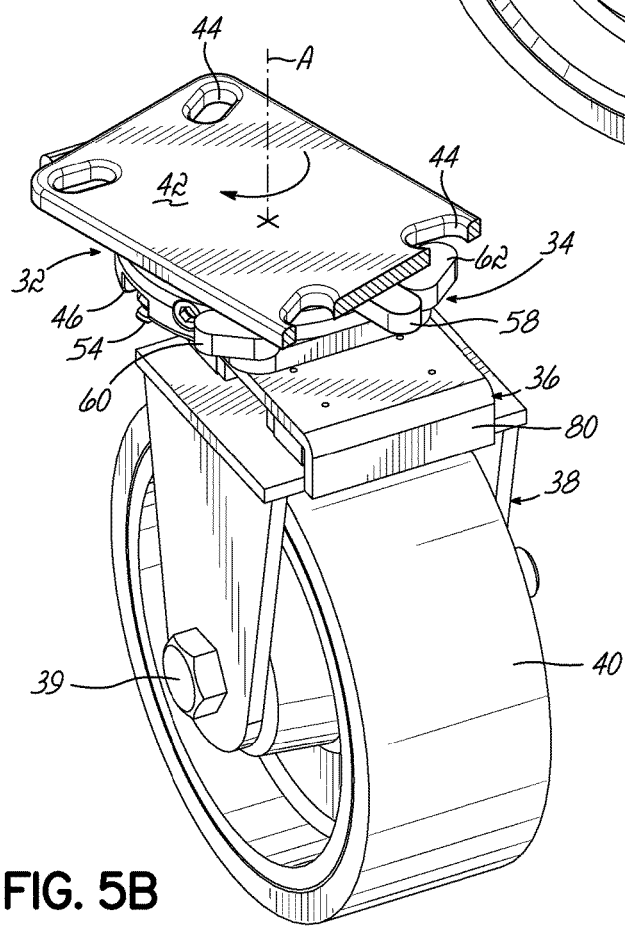
FIG. 5B is a perspective view similar to FIG. 5A, but showing the swivel caster in an exemplary second swiveled position.

As best shown in FIGS. 4-5B, the swivel limiter 34 includes a first swivel stop element 58 that may be fixed to an underside of the swivel plate 42 between a pair of the caster mounting holes 44 at a longitudinal end of the swivel plate 42. More specifically, the first swivel stop element 58 may be fixed along a central longitudinal axis of the swivel plate 42 that intersects the swivel axis A. The swivel limiter 34 further includes second and third swivel stop elements 60, 62 fixed to the swivel ring 46, for example on an upper surface thereof adjacent a base portion of the outer bearing race 52. As described below, the second and third swivel stop elements 60, 62 swivel with the swivel ring 46 and abut the first swivel stop element 58 to limit rotation of the swivel ring 46 and the caster wheel 40 about swivel axis A. The swivel stop elements 58, 60, 62 are shown in the form of oval-shaped protrusions, though it will be appreciated that they may be formed with various other shapes in alternative embodiments.

The horn 38, via the slide mechanism 36, is coupled to and depends downwardly from the swivel ring 46. The horn 38 includes a base plate 64 and a pair of legs 66 extending downwardly from the base plate 64. The legs 66 include a pair of opposed axle holes 68 through which the wheel axle 39 is received for coupling the wheel 40 to the horn 38, for example with a nut 72. The wheel 40 is rotatable about the wheel axle 39, and specifically about a horizontal rolling axis defined by the wheel axle 39, so as to enable rolling movement of the swivel caster 30 in a direction in which the wheel 40 is aligned.

The slide mechanism 36 couples the horn 38 to the swivel ring 46 such that the wheel 40, the horn 38, and the slide mechanism 36 may swivel with the swivel ring 46 about the swivel axis A, relative to the swivel plate 42. As shown best in FIG. 4, the slide mechanism 36 generally includes a slide mounting plate 74, a pair of guide rails 76 fixed in parallel relation to one another to the slide mounting plate 74, and one or more carriages 78 slidable along the guide rails 76.

Each of the carriages 78 includes an internal bearing assembly (not shown) having a plurality of rolling bearing elements that engage the respective guide rail 76. In exemplary embodiments, such as that shown, the guide rails 76 and corresponding mating features of the carriages 78 may be formed with a generally rectangular cross-section and of a material, such as carbon steel, suitable to support a compressive radial load (i.e., along the swivel axis A, perpendicular to the rolling axis) of up to approximately 130,000 pounds, for example. Further, while the illustrated embodiment includes first and second carriages 78 mounted to each of the first and second guide rails 76, it will be appreciated that various other quantities of guide rails 76 and carriages 78 may be provided depending on the range of radial loads that the swivel caster 30 must support for a given application.

The slide mounting plate 74 includes opposing first and second slide stops 80, 82 arranged at its first and second longitudinal ends. Each slide stop 80, 82 projects in a direction generally transverse to slide axes defined by the linear guide rails 76, and is positioned adjacent to a respective set of ends of the guide rails 76 so as to limit a sliding range of the carriages 78 along the guide rails 76. In the embodiment shown, the slide mounting plate 74 and slide stops 80, 82 are formed integrally as a generally U-shaped plate. In alternative embodiments, the slide stops 80, 82 may be formed separately from and coupled to the slide mounting plate 74, for example.

The horn base plate 64 may be mounted directly to the carriages 78, for example with a plurality of threaded fasteners 84. As shown, the base plate 64 may be formed with a rectangular shape and may be mounted to the carriages 78 such that a carriage 78 is positioned generally at each corner of the base plate 64. Advantageously, this arrangement allows for effective transfer of compressive radial loads between the slide mechanism 36 and the horn 38 during use. The slide mounting plate 74 may be fixed directly to a landing surface 86 on an underside of the swivel ring 46, for example by welding. With this arrangement, the slide mechanism 36, the horn 38, and the wheel 40 are pivotally fixed to one another, and thus swivel with the swivel ring 46 about the swivel axis A, relative to the swivel plate 42.

Referring to FIGS. 5A and 5B, the caster wheel 40, via the swivel ring 46, swivels about the swivel axis A in first and second directions. As shown in FIG. 5A, swiveling of the wheel 40 in an exemplary first direction is limited by contact of the second swivel stop element 60 on the swivel ring 46 with the first swivel stop element 58 on the swivel plate 42. Similarly, as shown in FIG. 5B, swiveling of the wheel 40 in an exemplary second direction is limited by contact of the third swivel stop element 62 with the first swivel stop element 58. Accordingly, a swiveling range of the horn 18 and wheel 40 is defined by a circumferential spacing between the second and third swivel stop elements 60, 62 about the swivel axis A, as well as a radial spacing of the first, second, and third swivel stop elements 58, 60, 62 from swivel axis A. In exemplary embodiments, the swivel stop elements 58, 60, 62 may be arranged with such spacings so as to define a swiveling range of the horn 38 and wheel 40 of approximately 5 degrees to approximately 32 degrees in each of the first and second directions relative to a neutral swivel position in which the wheel 40 is aligned with a longitudinal axis of the swivel plate 42. As described below, restriction of the wheel swiveling range provided by the swivel limiter 34 activates the slide mechanism 36 to slidingly reposition the wheel 40 between first and second trailing positions.

Figure 6A:
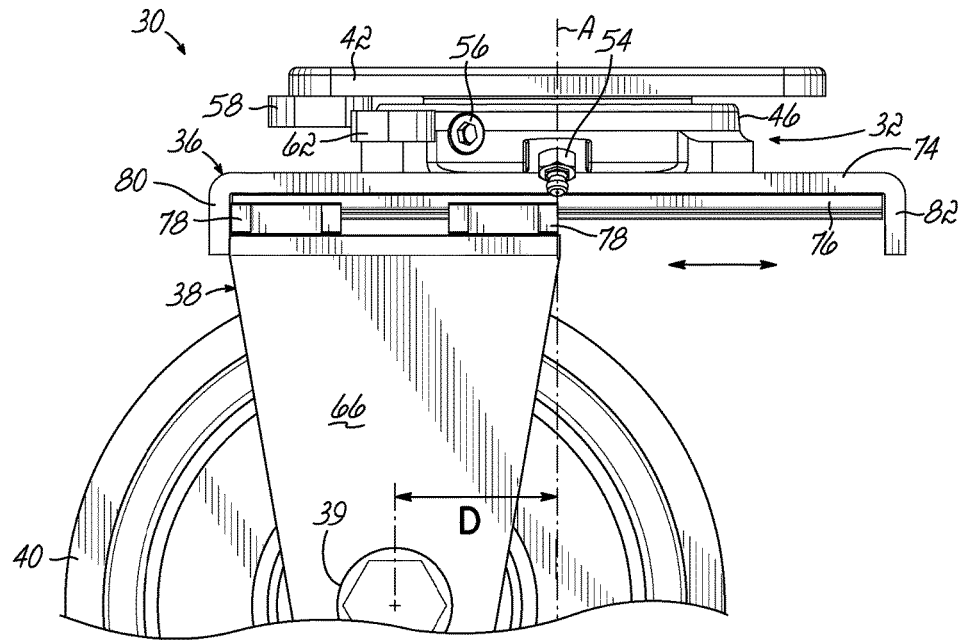
FIG. 6A is a side view of the swivel caster of FIG. 1, showing the horn and wheel in an exemplary first trailing position relative to the swivel axis.
Figure 6B:
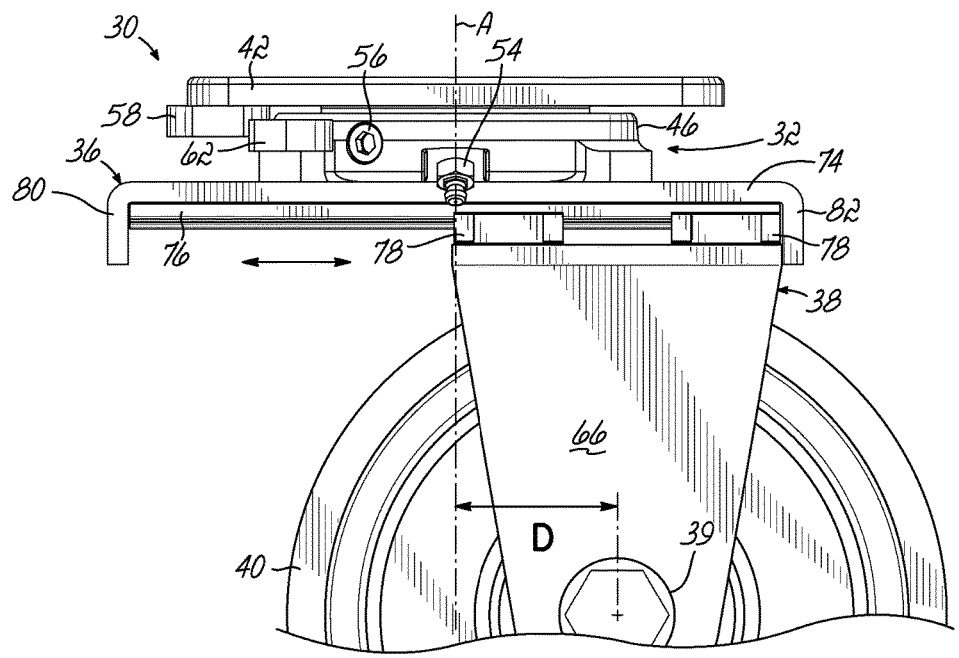
FIG. 6B is a side view similar to FIG. 6A, but showing the horn and wheel in an exemplary second trailing position relative to the swivel axis.

Referring to FIGS. 6A and 6B, the slide mechanism 36 enables the wheel 40 to slide in a direction generally perpendicular to the swivel axis A between first and second trailing positions when a vehicle to which the swivel caster 30 is mounted reverses or otherwise changes its direction of travel. With reference to FIG. 6A, the wheel 40 is shown in an exemplary first trailing position in which a first set of the carriages 78 abuts the first slide stop 80 of the slide mounting plate 74. With reference to FIG. 6B, the wheel 40 is shown in an exemplary second trailing position in which a second set of the carriages 78 abuts the second slide stop 82 of the slide mounting plate 74. In each of the first and second trailing positions, the wheel axle 39 is offset in a generally horizontal direction from swivel axis A. In other words, the axle 39 "trails" the swivel axis A such that a first plane passing through the rolling axis defined by the axle 39 and parallel to the swivel axis A is offset from a second, parallel plane passing through the swivel axis A.

In each of the first and second trailing positions, the wheel 40 trails by a "trailing distance" (also known as "offset" or "lead") D measured between the rolling axis of the wheel axle 39 and the swivel axis A. As shown best in FIGS. 6A and 6B, the slide mounting plate 74 may be centrally mounted to the swivel ring 46 such that a first trailing distance corresponding to the first trailing position is equal to a second trailing distance corresponding to the second trailing position. In other words, and as a result of the linear configuration of the guide rails 76, the first and second trailing positions may be diametrically opposed from one another.

It will be appreciated that the trailing distance D in each of the first and second trailing positions may be defined by a linear spacing between the first and second slide stops 80, 82 of the slide mounting plate 74, as well as a corresponding length of the guide rails 76 and a linear spacing of the carriages 78. As such, the slide stops 80, 82, guide rails 76, and carriages 78 may be arranged as desired to achieve any suitable trailing distance D. In an exemplary embodiment, these components may be arranged so as to define a trailing distance D of approximately 2 inches, for example.

Figure 7:
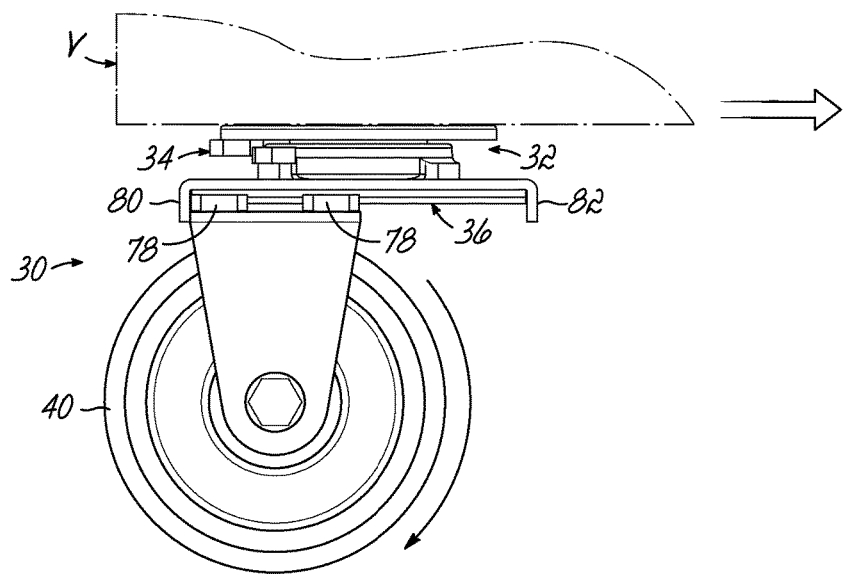
FIG. 7 is a side view of the swivel caster of FIG. 1 attached to an exemplary transport vehicle, showing the horn and wheel in an exemplary first trailing position as the vehicle moves in a first direction of travel.
Figure 8A:
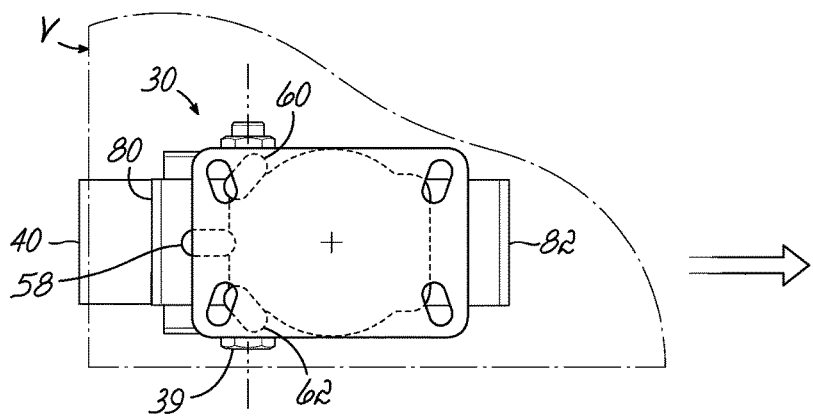
FIG. 8A is a top view of the swivel caster and transport vehicle of FIG. 7.
Figure 8B:
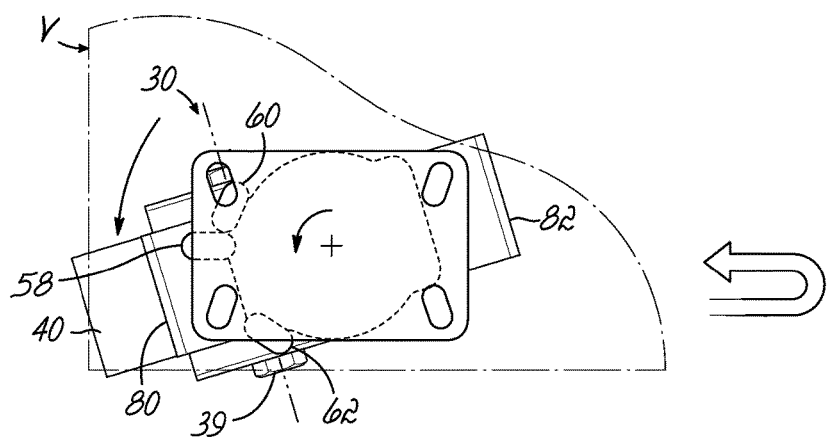
FIG. 8B is a top view similar to FIG. 8A, but showing the transport vehicle reversing its direction of travel and causing the wheel to swivel and engage the swivel limiter.
Figure 8C:
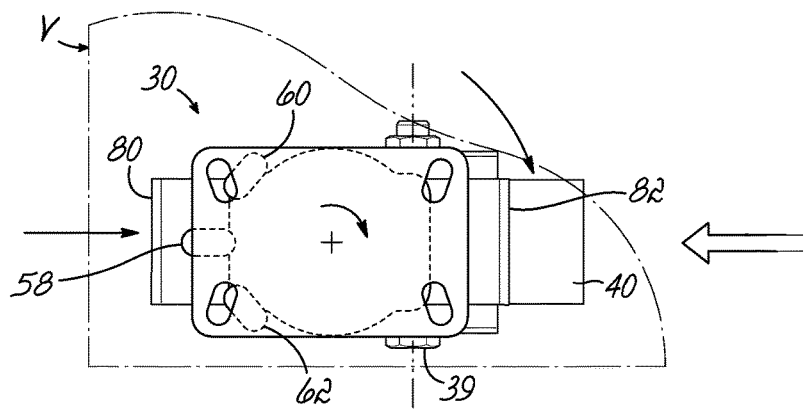
FIG. 8C is a top view similar to FIG. 8B, showing the wheel after having slid to a second trailing position via the slide mechanism and swiveled to align with a new direction of travel of the transport vehicle.

Referring to FIGS. 7-8C, an exemplary use of the swivel caster 30 will now be described. As shown in FIGS. 7 and 8A, the swivel caster 30 is mounted to an exemplary transport vehicle V, which is shown traveling in an exemplary first direction. The wheel 40 is arranged in a first trailing position in which a first set of the carriages 78 abuts the first slide stop 80 of the slide mounting plate 74. As best shown in FIG. 8A, the wheel 40 trails to align itself with the vehicle direction of travel, such that the wheel 40 is in a "neutral" swivel position. In this neutral swivel position, the second and third swivel stop elements 60, 62 of the swivel limiter 34 are equally spaced on either side of the first swivel stop element 58 and the wheel 40 is generally aligned with a longitudinal axis of the swivel plate 42.

With reference to FIG. 8B, the direction of travel of the vehicle V may be reversed when the vehicle V is acted upon by an external force, such as a push or pull force applied by an operator. This change in direction causes the wheel 40 to swivel until one of the second or third swivel stop elements 60, 62 of the swivel limiter 34 contacts the first swivel stop element 58, depending on the direction in which the wheel 40 swivels. In the exemplary scenario shown, the wheel 40 swivels in a counter-clockwise direction until the second swivel stop element 60 contacts the first swivel stop element 58. Because the first swivel stop element 58 is rigidly fixed to the swivel plate 42, the lower swiveling portion of the caster 30, including the wheel 40, is prevented from swiveling further.

Figure 9:
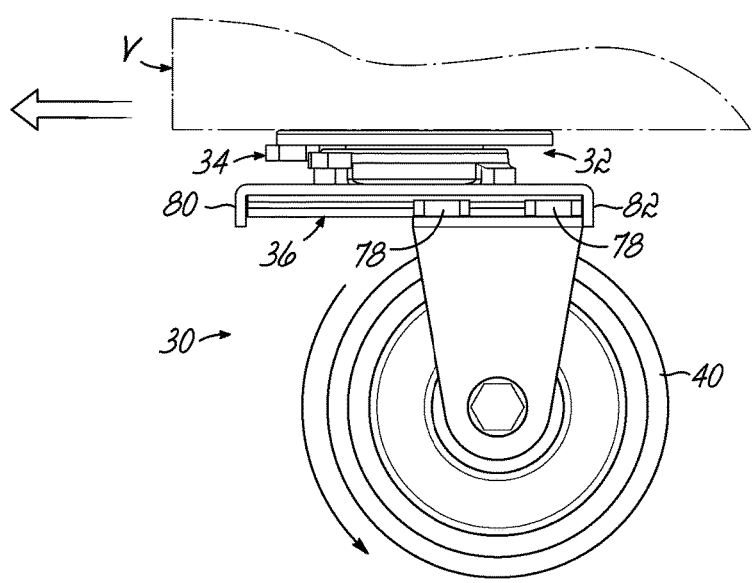
FIG. 9 is a side view of the swivel caster in its new trailing position of FIG. 8C.

When the external force applied to the vehicle V for changing its direction of travel is maintained, the swivel-blocking effect provided by engagement of the swivel limiter 34 forces the wheel 40 to slide linearly, via the slide mechanism 36, from its first trailing position (FIG. 8A) toward its second trailing position, shown in FIGS. 8C and 9. In other words, engagement of the swivel limiter 34 activates the slide mechanism 36 to guide the wheel 40 between its trailing positions. As shown in FIG. 8C, upon reaching its new trailing position, the wheel 40 swivels slightly in a direction opposite the original swivel direction, to align itself with the new direction of travel of the vehicle 10 and re-establish a neutral swivel position.

Unless the external force applied to the vehicle V for initiating its change in direction is nearly perfectly aligned with the longitudinal axis of the slide mechanism 36, the wheel 40 will initially prefer to swivel rather than slide toward its new trailing position. Accordingly, without the swivel limiter 34, the wheel 40 would be free to transition to a new trailing position purely by swiveling, without activating the slide mechanism 36. For vehicle turns that deviate from the original direction of vehicle travel by more than 90 degrees (e.g., the 180 degree reversal in direction shown herein), swiveling to a new trailing position would disadvantageously result in wheel "scrub" along the ground surface. The swivel limiter 34 of the present invention limits the ability of the wheel 40 to swivel, and thus forces the wheel 40 to transition to its new trailing position via the slide mechanism 36, without swiveling to the scrub point. Consequently, and advantageously, wheel scrub is substantially eliminated, thereby reducing the magnitude of external force required to be applied to the vehicle V to complete the change in direction, and reducing stress on and resultant wear of the swivel assembly 32.

Moreover, because the wheel 40 is able to achieve its new trailing position with a minimal degree of swiveling, via the slide mechanism 36, the area of environment required to accommodate the wheel 40 during this transition is kept to a minimum. As such, in exemplary embodiments, the swivel casters 30 may be driven along ground tracks (not shown) having a minimal width, thereby providing space-saving benefits.

While FIGS. 7-9 show a change in vehicle direction of 180 degrees (i.e., a reversal in direction), it will be appreciated that the swivel limiter 34 and slide mechanism 36 may cooperate as described above to slidingly transition the wheel 40 to a new trailing position for changes in vehicle direction that are less than 180 degrees. In that regard, the second and third swivel stop elements 60, 62 may be arranged as desired so as to define any suitable swiveling range of the wheel 40, and thereby permit any suitable degree of changes in vehicle direction.

Figure 10:
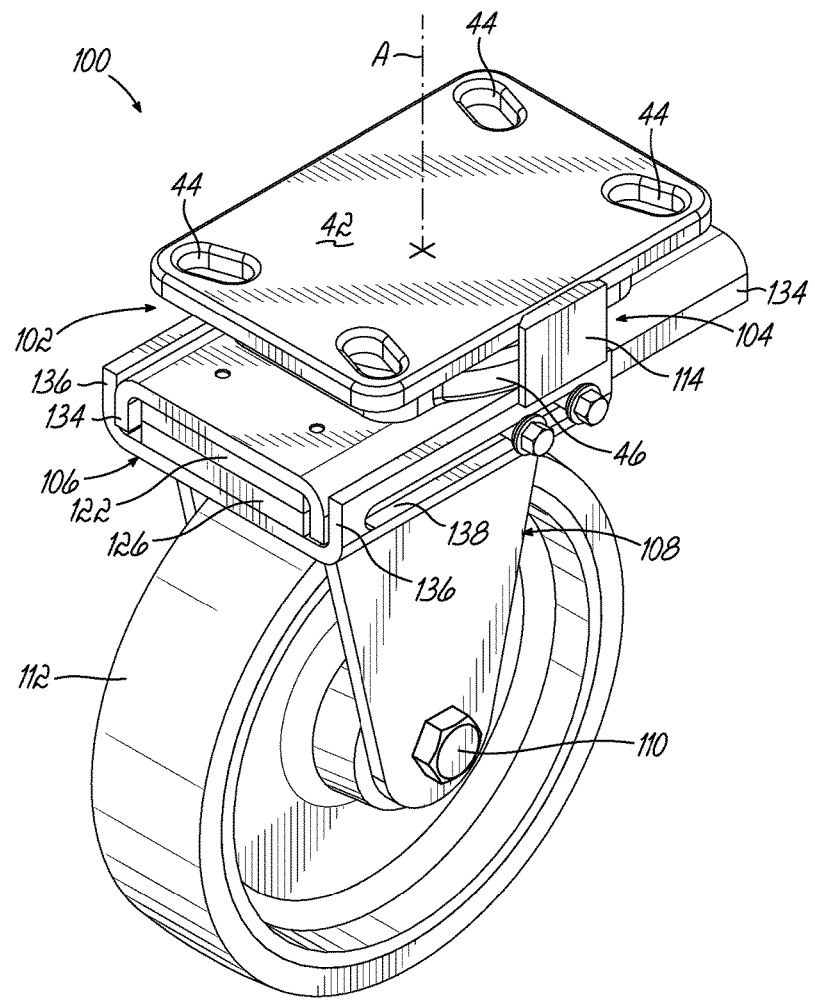
FIG. 10 is a perspective view of a swivel caster having a slide mechanism and a swivel limiter in accordance with a second exemplary embodiment of the invention.
Figure 11:
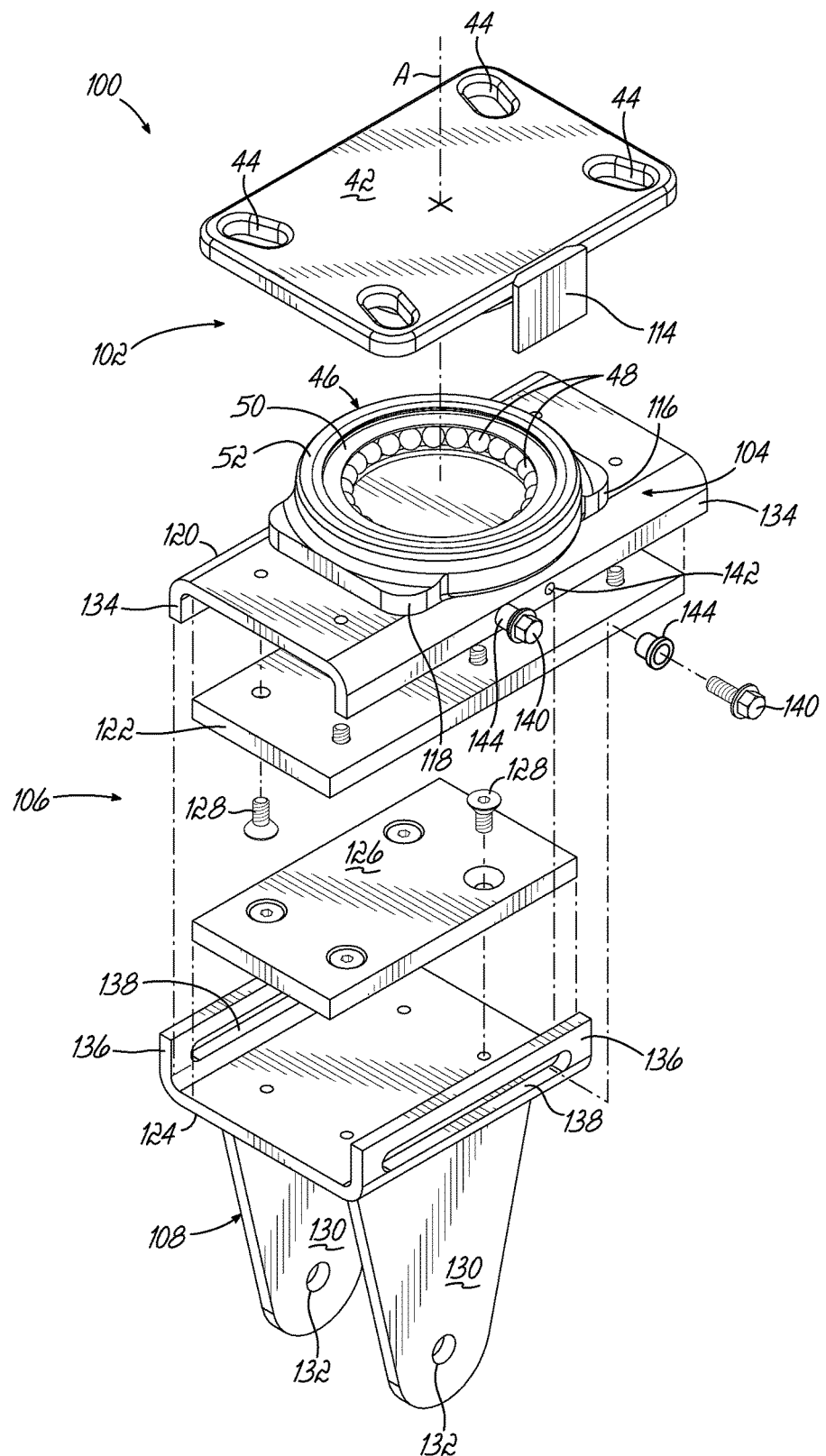
FIG. 11 is a partially exploded view of the swivel caster of FIG. 10, shown without its wheel.

Referring to FIGS. 10 and 11, a swivel caster 100 in accordance with another exemplary embodiment of the invention is shown. Swivel caster 100 is functionally similar to swivel caster 30 of FIG. 2, but differs structurally as described in greater detail below. The swivel caster 100 generally includes a swivel assembly 102 defining a swivel axis A, a swivel limiter 104, a slide mechanism 106, a horn 108, an axle 110, and a wheel 112. The swivel assembly 102 may be similar in structure and function to swivel assembly 32 of swivel caster 30, as indicated by like reference numerals used in connection with subcomponents of the swivel assemblies 32, 102. Accordingly, swivel assembly 102 will not be described in significant detail below.

Similar to swivel limiter 34, swivel limiter 104 limits a swiveling range of the horn 108 and wheel 112 about the swivel axis A so as to activate the slide mechanism 106 to reposition the wheel 112 between first and second trailing positions when the vehicle V changes its direction of travel. As best shown in FIG. 11, the swivel limiter 104 includes a plate-like first swivel stop element 114 fixed along a side edge of the swivel plate 42, and second and third swivel stop elements 116, 118 formed on the swivel ring 46. In the illustrated embodiment, the second and third swivel stop elements 116, 118 are defined by corners of a rectangular portion of the swivel ring 46, though it will be appreciated that the swivel stop elements 116, 118 may be formed with various alternative shapes and configurations. In the illustrated embodiment, an annular portion of the swivel plate 42 extends axially upward along the swivel axis A from the rectangular portion and defines the outer bearing race 52. The second and third swivel stop elements 116, 118 engage the first swivel stop element 114 to limit the swiveling range of the swivel ring 46, and thus the wheel 112, about the swivel axis A.

The slide mechanism 106, similar to slide mechanism 36, couples the horn 108 to the swivel ring 46 such that the wheel 112, the horn 108, and the slide mechanism 106 may swivel with the swivel ring 46 about the swivel axis A. As shown best in FIG. 11, the slide mechanism 106 generally includes an upper mounting plate 120, an upper slide plate 122 secured to the upper mounting plate 120, a lower mounting plate 124 arranged axially beneath the upper mounting plate 120, and a lower slide plate 126 secured to the lower mounting plate 124. The upper and lower slide plates 122, 126 may be removably secured to the upper and lower mounting plates 120, 124, respectively, such as with threaded fasteners 128, for example. As described below, the lower slide plate 126 contacts and slides along the upper slide plate 122 to enable the horn 108 and wheel 112 to slide linearly in a horizontal plane between first and second trailing positions.

The upper mounting plate 120 is secured to a lower surface of the swivel ring 46, while the lower mounting plate 124 may define an upper portion of the horn 108, similar to horn base plate 64 of swivel caster 30. The horn 108 further includes a pair of legs 130 extending downwardly from the lower mounting plate 124. The legs 130 include a pair of opposed axle holes 132 through which the wheel axle 110 is received for coupling the wheel 112 to the horn 108 (the wheel 112 and axle 110 being hidden from view in FIGS. 11-13B). Each of the upper and lower mounting plates 120, 124 may be formed with a generally U-shaped cross-section, so as to define first and second opposed sides 134 of the upper mounting plate 120, and first and second opposed sides 136 of the lower mounting plate 124.

The upper and lower mounting plates 120, 124 are coupled to one another so as to enable the upper and lower slide plates 122, 126 to slide relative to one another in a generally horizontal direction (i.e., perpendicular to the swivel axis A), while restricting axial movement along the swivel axis A between the mounting plates 120, 124. As shown best in FIG. 11, the lower mounting plate 124 may include a pair of elongate slots 138 extending lengthwise through its sides 136. The upper and lower mounting plates 120, 124 may be coupled together axially with a plurality of fasteners, shown in the form of threaded fasteners 140, that cooperate with the elongate slots 138. Specifically, the fasteners 140 may extend through the elongate slots 138 and threadedly engage, for example, bores 142 formed in the sides 134 of the upper mounting plate 120. The swivel caster 100 may include first and second pairs of fasteners 140 and corresponding bores 142, the pairs being spaced from one another along a longitudinal direction of the upper mounting plate 120.

Figure 13A:
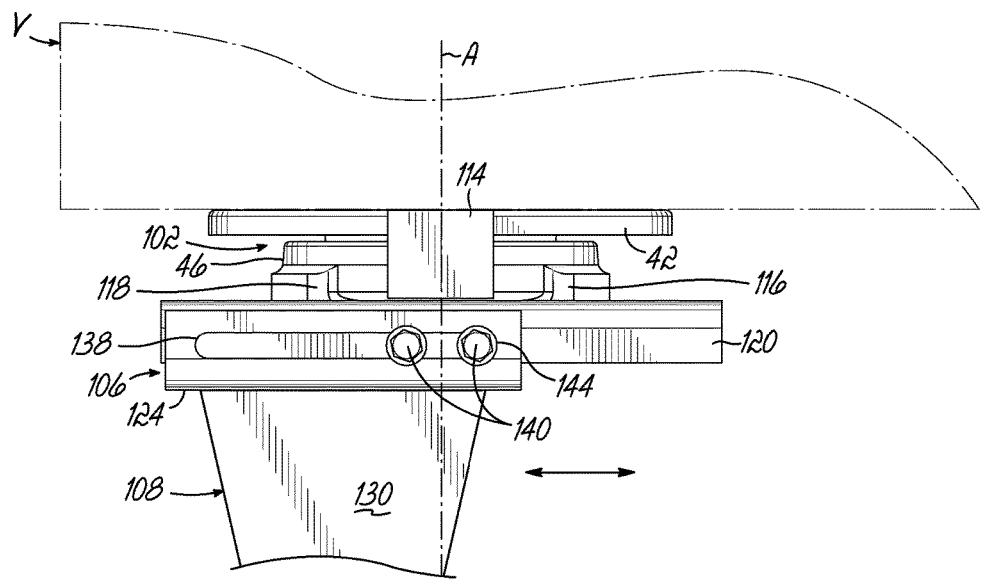
FIG. 13A is a side view of the swivel caster of FIG. 10, showing the horn in an exemplary first trailing position relative to the swivel axis.
Figure 13B:
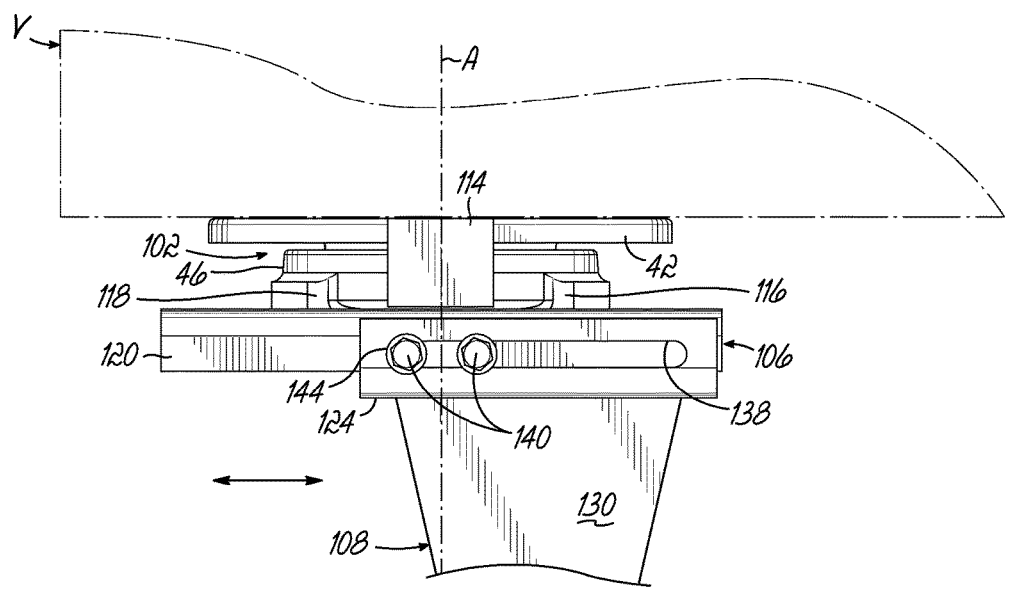
FIG. 13B is a side view similar to FIG. 13A, but showing the horn in an exemplary second trailing position relative to the swivel axis.

Each fastener 140 may be encased within a flanged sleeve bearing 144 that extends through the corresponding elongate slot 138 and facilitates sliding movement of the lower mounting plate 124 relative to the upper mounting plate 120 with minimal generation of friction. The sleeve bearings 144 may be formed of a low-friction material such as oil-imbedded bronze, for example. A first pair of the sleeve bearings 144 contact a first set of longitudinal ends of the elongate slots 138 to define a first trailing position of the horn 108 and wheel 112 (e.g., as shown in FIG. 13A). Likewise, a second pair of the sleeve bearings 144 contact an opposed second set of longitudinal ends of the elongate slots 138 to define a second trailing position of horn 108 and wheel 112 (e.g., as shown in FIG. 13B). As such, a longitudinal spacing between the first and second pairs of the sleeve bearings 144 defines the sliding range of the horn 108 and wheel 112 between the first and second trailing positions. As shown in FIG. 11, the first and second pairs of bores 142 corresponding to the first and second pairs of sleeve bearings 144 may be arranged substantially equidistant from a transverse plane extending through the swivel axis A.

The upper and lower slide plates 122, 126 directly contact and slide horizontally relative to one another to enable the horn 108 and wheel 112 to slide relative to the swivel plate 42 between first and second trailing positions. More specifically, the upper slide plate 122 remains fixed in a horizontal direction while the lower slide plate 126 slides horizontally along the upper slide plate 122. The engagement of the upper mounting plate sides 134 with the lower mounting plate slides 136 guide the sliding movement in a generally linear direction along the longitudinal axes of the mounting plates 120, 124.

The upper and lower slide plates 122, 126 are each formed of a material suitable to achieve an interface that generates minimal friction during this relative sliding motion. In exemplary embodiments, the upper and lower slide plates 122, 126 may be formed of polytetrafluoroethylene (also known as Teflon), for example. In alternative embodiments, various other materials having a coefficient of friction similar to or less than that of polytetrafluoroethylene may be used. It will be appreciated that the upper and lower slide plates 122, 126 may be formed of different materials or the same material.

Further, because the slide mechanism 106 achieves sliding movement via direct surface contact between upper and lower slide plates 122, 126, it will be appreciated that in certain cases the swivel caster 100 may be better suited for lighter duty applications than swivel caster 30. For example, swivel caster 100, including its slide mechanism 106, may be configured to support a compressive radial load (i.e., along the swivel axis A) of up to approximately 3,000 pounds.

As discussed above, although the slide mechanism 106 of swivel caster 100 differs structurally from the slide mechanism 36 of swivel caster 30, both swivel casters 30, 100, including their slide mechanisms 36, 106, function in a similar manner. In particular, the wheel 40, 112 of each swivel caster 30, 100 swivels a limited degree to the point of engaging a swivel limiter 34, 104, at which point a slide mechanism 36, 106 is activated to slide the horn 38, 108 and wheel 40, 112 horizontally relative to the swivel plate 42 from a first trailing position to a second trailing position. An exemplary operation of swivel caster 30 is shown and described in detail in connection with FIGS. 7-9. Though not shown, it will be appreciated that swivel caster 100 may operate in a similar manner and thus provide similar benefits.

Figure 12A:
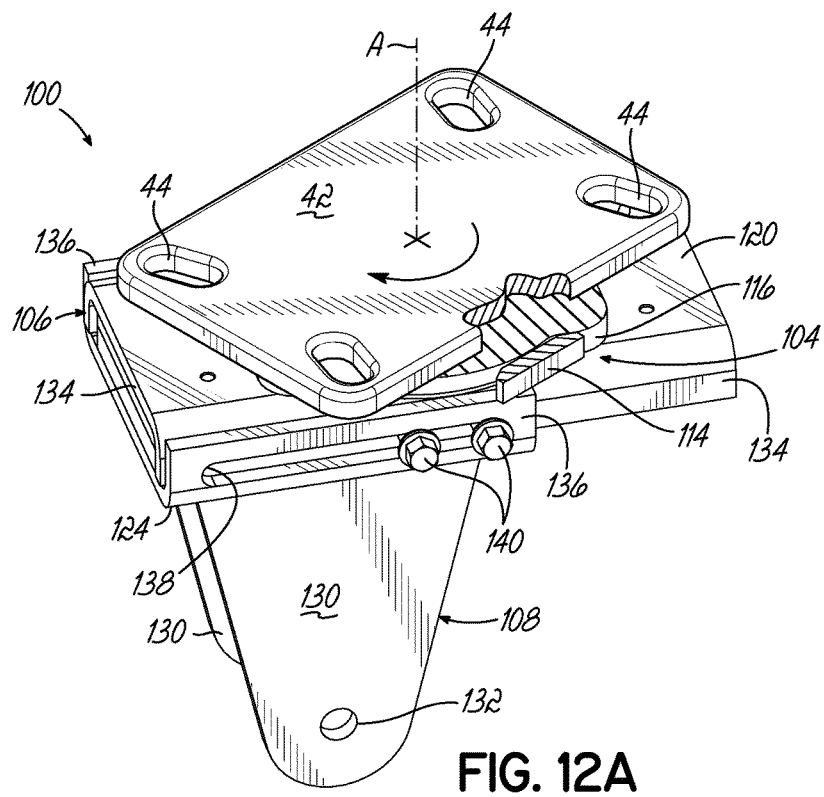
FIG. 12A is a perspective view of the swivel caster of FIG. 10, shown in an exemplary first swiveled position and without its wheel.
Figure 12B:
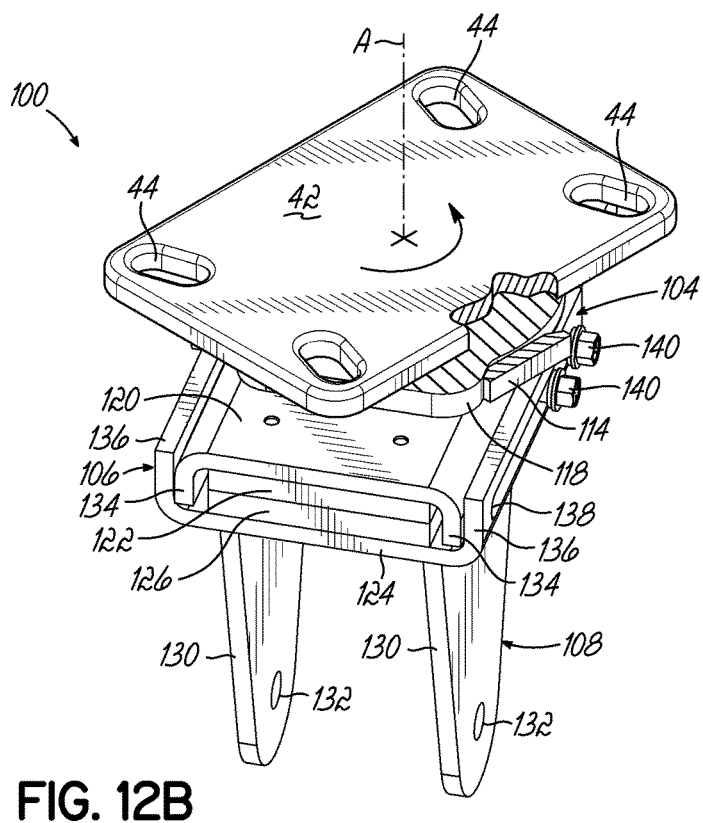
FIG. 12B is a perspective view similar to FIG. 12A, but showing the swivel caster in an exemplary second swiveled position.

Referring to FIGS. 12A and 12B, the caster horn 108 and wheel 112 (not shown), via the swivel ring 46, swivel about the swivel axis A in first and second directions. As shown in FIG. 12A, swiveling of the horn 108 in an exemplary first direction is limited by contact of the first swivel stop element 114 (shown partially cut-away) with the second swivel stop elements 116 formed on the swivel ring 46. As shown in FIG. 12B, swiveling of the horn 108 in an exemplary second direction is limited by contact of the first swivel stop element 114 with the third swivel stop element 118. As shown, the first swivel stop element 114 may include beveled edges for more efficiently contacting the second and third swivel stop elements 116, 118.

The swiveling range of the horn 108 and wheel 112 about the swivel axis A is determined by a circumferential spacing between the second and third swivel stop elements 116, 118 on the swivel ring 46, and a length of the first swivel stop element 114 in the longitudinal direction of the swivel plate 42. In exemplary embodiments, the second and third swivel stop elements 116, 118 may be positioned, and the first swivel stop element 114 may be sized, so as to define a swiveling range of the horn 108 and wheel 112 of approximately 3 degrees to approximately 45 degrees in each of the first and second directions about the swivel axis A, relative to a neutral swivel position. For example, the components of the swivel caster 100 may be arranged so as to define a swiveling range of approximately 10 degrees.

As shown in FIGS. 13A and 13B, the slide mechanism 106 enables the horn 108 and wheel 112 (not shown) to slide horizontally relative to the swivel plate 42 (and thus relative to a vehicle V to which the swivel caster 100 is mounted) between first and second trailing positions. FIG. 13A shows the horn 108 in an exemplary first trailing position in which a first pair of the sleeve bearings 144 contact first ends of the elongate slots 138. FIG. 13B shows the horn 108 in an exemplary second trailing position in which the lower slide plate 126 has slid relative to the upper slide plate 122 so that a second pair of the sleeve bearings 144 contact second ends of the elongate slots 138. As such, the longitudinal ends of the elongate slots 138 operate as slide stops, similar to slide stops 80, 82 of swivel caster 30.

The swivel limiter 104 and slide mechanism 106 of swivel caster 100 cooperate in a manner similar to the swivel limiter 34 and slide mechanism 36 of swivel caster 30, described above in connection with FIGS. 7-9. In that regard, restriction of the swiveling range by the swivel limiter 104 activates the slide mechanism 106 to slidingly reposition the horn 108 and the wheel 112 between the first and second trailing positions. As such, swivel caster 100 presents similar benefits as swivel caster 30, including substantial reduction in the stress exerted on components of the swivel assembly 102 and wheel tread during changes in vehicle direction, particularly reversals in direction. Additional benefits include reduction in the surrounding area needed to accommodate the wheel 112 as it reverses its trailing position, because the transitional movement is accomplished primarily by horizontal sliding across the swivel axis A rather than by swiveling about the swivel axis A.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope of the general inventive concept.

What is claimed is:

1. A swivel caster, comprising:
  a swivel assembly including a swivel plate configured to be mounted to a vehicle, the swivel assembly defining a swivel axis;
  a horn depending downwardly from the swivel assembly;
  a wheel coupled to the horn with a wheel axle and configured to swivel with the horn about the swivel axis;
  a slide mechanism that couples the horn to the swivel assembly and enables the wheel to slide in a direction generally perpendicular to the swivel axis between first and second trailing positions, wherein the slide mechanism swivels with the horn and the wheel about the swivel axis; and
  a swivel limiter operatively associated with the swivel assembly, wherein the swivel limiter limits a swiveling range of the wheel about the swivel axis so as to activate the slide mechanism to reposition the wheel from the first trailing position to the second trailing position when a direction of travel of the vehicle changes.

2. The swivel caster of claim 1, wherein the swivel limiter is positioned so as to limit the wheel to a swiveling range of less than 180 degrees relative to a neutral wheel position.

3. The swivel caster of claim 2, wherein the swivel limiter limits the wheel to a swiveling range of less than or equal to approximately 32 degrees and greater than or equal to approximately 5 degrees in each direction relative to a neutral swivel position.

4. The swivel caster of claim 1, wherein the slide mechanism includes at least one guide rail fixed relative to a portion of the swivel assembly and at least one carriage fixed relative to the horn, the at least one carriage slidable along the at least one guide rail to reposition the wheel between the first and second trailing positions.

5. The swivel caster of claim 4, wherein the at least one guide rail includes first and second guide rails, and the at least one carriage includes a plurality of carriages slidable along the first and second guide rails.

6. The swivel caster of claim 4, wherein the slide mechanism further includes a slide mounting plate coupled to the swivel assembly, the at least one guide rail being fixed to the slide mounting plate.

7. The swivel caster of claim 4, wherein the slide mechanism is configured to support a compressive radial load of up to approximately 130,000 pounds.

8. The swivel caster of claim 1, wherein the slide mechanism includes an upper slide plate fixed relative to the swivel assembly and a lower slide plate fixed relative to the horn, the upper and lower slide plates arranged in contacting relation and being slidable relative to one another to reposition the wheel between the first and second trailing positions.

9. The swivel caster of claim 8, wherein at least one of the upper and lower slide plates is formed from polytetrafluoroethylene.

10. The swivel caster of claim 8, wherein the slide mechanism further includes an upper slide mounting plate coupled to the swivel assembly and a lower slide mounting plate coupled to the horn, the upper slide plate being fixed to the upper slide mounting plate and the lower slide plate being fixed to the lower slide mounting plate.

11. The swivel caster of claim 8, wherein the slide mechanism is configured to support a compressive radial load of up to approximately 3,000 pounds.

12. A transport vehicle configured to move along a ground surface and including at least one swivel caster, the at least one swivel caster comprising:
  a swivel assembly including a swivel plate configured to be mounted to a vehicle, the swivel assembly defining a swivel axis;
  a horn depending downwardly from the swivel assembly;
  a wheel coupled to the horn with a wheel axle and configured to swivel with the horn about the swivel axis;
  a slide mechanism that couples the horn to the swivel assembly and enables the wheel to slide in a direction generally perpendicular to the swivel axis between first and second trailing positions, wherein the slide mechanism swivels with the horn and the wheel about the swivel axis; and
  a swivel limiter operatively associated with the swivel assembly, wherein the swivel limiter limits a swiveling range of the wheel about the swivel axis so as to activate the slide mechanism to reposition the wheel from the first trailing position to the second trailing position when a direction of travel of the vehicle changes.

13. The transport vehicle of claim 12, wherein the swivel limiter is positioned so as to limit the wheel to a swiveling range of less than 180 degrees relative to a neutral wheel position.

14. The transport vehicle of claim 13, wherein the swivel limiter limits the wheel to a swiveling range of less than or equal to approximately 32 degrees and greater than or equal to approximately 5 degrees in each direction relative to a neutral swivel position.

15. The transport vehicle of claim 12, wherein the slide mechanism includes at least one guide rail fixed relative to a portion of the swivel assembly and at least one carriage fixed relative to the horn, the at least one carriage slidable along the at least one guide rail to reposition the wheel between the first and second trailing positions.

16. The transport vehicle of claim 15, wherein the at least one guide rail includes first and second guide rails, and the at least one carriage includes a plurality of carriages slidable along the first and second guide rails.

17. The transport vehicle of claim 15, wherein the slide mechanism further includes a slide mounting plate coupled to the swivel assembly, the at least one guide rail being fixed to the slide mounting plate.

18. The transport vehicle of claim 12, wherein the slide mechanism includes an upper slide plate fixed relative to the swivel assembly and a lower slide plate fixed relative to the horn, the upper and lower slide plates arranged in contacting relation and being slidable relative to one another to reposition the wheel between the first and second trailing positions.

19. The swivel caster of claim 18, wherein at least one of the upper and lower slide plates is formed from polytetrafluoroethylene.

20. The swivel caster of claim 18, wherein the slide mechanism further includes an upper slide mounting plate coupled to the swivel assembly and a lower slide mounting plate coupled to the horn, the upper slide plate being fixed to the upper slide mounting plate and the lower slide plate being fixed to the lower slide mounting plate.

* * * * *